United States Patent Office 3,380,955
Patented Apr. 30, 1968

3,380,955
POLYESTER POLYOLS CONTAINING A COUMARIN BRIGHTENER AND A BLUE DYE
James M. Cross and Charles Douglas Nolen, New Martinsville, W. Va., assignors to Mobay Chemical Company, Pittsburgh, Pa., a corporation of Delaware
No Drawing. Filed Aug. 3, 1964, Ser. No. 387,208
10 Claims. (Cl. 260—40)

ABSTRACT OF THE DISCLOSURE

Polyester polyols which contain a mixture of a coumarin brightener and a blue dye in amounts of from about 0.000005% to 0.0003% by weight. The resulting polyester polyols are water white and can be used to prepare polyurethane plastics.

---

This invention relates to polyesters and more particularly to substantially water-white, liquid polyester polyols.

In the manufacture of polyester polyols which are suitable for the production of polyurethane plastics, it is very difficult to avoid the formation of color bodies. The polyester polyols are prepared by condensing a polycarboxylic acid with a stoichiometric excess of a polyhydric alcohol. The polyester polyols forming ingredients are usually cooked at a temperature above 200° C. under partial vacuum down to about 10 mm. Hg. Due to these conditions of preparation coupled with oxidation reactions, the polyester polyols often have a yellow tinge.

It has been proposed heretofore when preparing solid polyesters suitable for casting or the preparation of fibers to include a dye or an optical brightener to mask or to neutralize the yellowish tinge imparted to the polyester by the condition of its preparation or solidification. One process is proposed in U.S. Patent 1,983,658 wherein it is proposed to incorporate methyl violet 2-B into a citric acid polyester to neutralize the yellow color. It has been found when using liquid polyester polyols that the incorporation of a similar blue dye actually harms the color of the polyester. It has been proposed in U.S. Patent 3,026,283 to mask the yellow coloration of a solid polyester with a combination of ultramarine blue pigment and an oil soluble violet dye. This combination is also unsatisfactory for the liquid polyester polyol because it imparts gray discoloration and because the blue pigment is not soluble in the resin and will not remain permanently suspended in the liquid medium. It has also been proposed in U.S. Patent 2,875,089 to use optical brighteners containing two five-membered heterocyclic rings for improving the optical properties of heavily dyed polyester fibers. These polyesters are not water-white.

Thus, it has been known for some time that fluorescent compounds can be incorporated into off-white resinous materials to make them whiter or brighter. The optical brightening action is a result of an ability of the brightener to convert certain ultraviolet components of daylight to visible blue components which complement the undesired yellow tinge of the untreated resinous material so that the materials look white. In the production of the optical bleached solid polyesters, polystyrene or the like, one can tolerate large amounts of the brightening agent and one may use compounds which are relatively insoluble with the solid products. This is not true of liquid polyester polyols.

It is therefore an object of this invention to provide improved water-white polyester polyols. Another object of this invention is to provide an improved method of optically brightening polyester polyols. A further object is to provide an improved polyester polyol adapted particularly for the production of brilliant white polyurethane plastics including foams, coatings, elastomers and the like.

The foregoing objects and others which will become apparent from the following description are accomplished in accordance with the invention, generally speaking, by providing a polyester polyol having a molecular weight of from about 500 to about 7500 containing from about 0.000005% to about 0.0003% by weight of a 7-triazinylamino-3-phenyl coumarin and from about 0.000005% to about 0.0003% by weight of an organic solvent soluble blue dye. Therefore, the present invention contemplates substantially water-white polyester polyols which preferably have a molecular weight of from about 1500 to about 5000 and which contain from about 0.000005% to about 0.0003% by weight of a 7-triazinylamino-3-phenyl coumarin as more particularly set forth below and from about 0.000005% to about 0.0003% by weight of an organic solvent soluble blue dye which is preferably calco violet having the structure

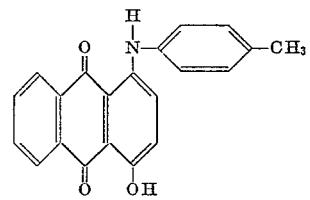

It has been found that when either the coumarin compound or the oil soluble blue dye is used alone, that only a slight improvement or indeed harm to the color characteristics to the polyester polyols results. This is illustrated by the following table. A polyester polyol having a molecular weight of about 2000 is prepared by combining about 15.6 mols of adipic acid with about 16.3 mols of diethylene glycol and about 1 mol of trimethylolpropane and heating to a temperature of about 250° C. under a partial vacuum until a hydroxyl number of about 56 is reached. This polyester is then combined with the amounts of brightener and/or blue dye shown in the following table. The depth of color, the APHA value, and the yellow value of the color are measured with the following results:

| Brightener | Blue Dye | Depth of Color | APHA Color | Yellow Value |
|---|---|---|---|---|
| 0 | 0 | .067 | 20 | .958 |
| .00004 | 0 | .094 | 29 | .964 |
| .000026 | .00002 | .062 | 19 | .987 |
| .000025 | .000025 | .061 | 19 | .993 |
| .00005 | .00005 | .090 | 28 | 1.002 |
| 0 | .000025 | .082 | 25 | .962 |

The brightener employed in the foregoing table has the following formula

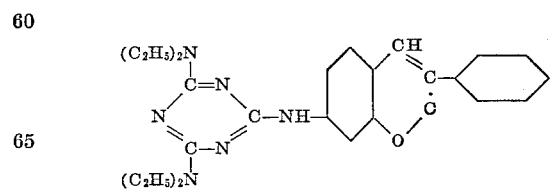

The blue dyed employed in the the experiments reported in the foregoing table is calco violet ZIRA, Color Index 60725 having the formula set forth above. It is apparent from the foregoing table that the depth of color, the APHA color value and the yellow value are vastly improved by using a combination of amounts of brightener and blue dye over the use of either alone. Large concentrations produce an equally undesirable blue hue to the polyester giving it an aquamarine tinge. Lesser amounts fail to compensate for the yellow value.

Any suitable oil soluble blue dye may be used such as indigo

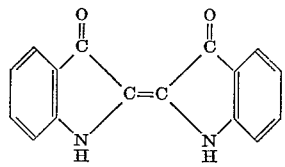

indanthrene blue RS

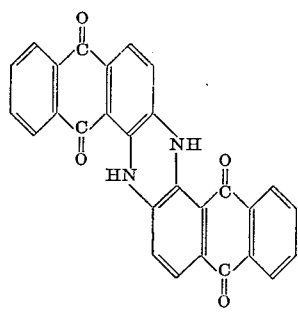

as well as products sold under the tradenames Hytherm blue, Hytherm blue-E, Calco oil Blue ZN and the like.

Any suitable 7-triazinylamino-3-phenyl coumarin may be used including those disclosed in U.S. Patent 2,945,033. The disclosure of that patent shows the preparation of suitable compounds for use in this invention which may be represented by the following formula

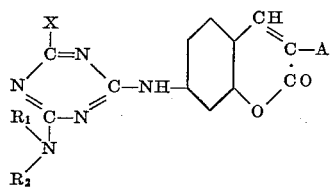

wherein $R_1$ and $R_2$ each represent a member selected from the group consisting of hydrogen, aliphatic, araliphatic, cycloaliphatic, mononuclear aryl and heterocyclic radicals and part of a cycle when taken together.

X represents a member selected from the group consisting of halogen, hydroxy, alkoxy, mononuclear, aryloxy, mononuclear arylmercapto and the radical

in which radical $R_1'$ and $R_2'$ have the same meaning as $R_1$ and $R_2$ above and A represents an isocyclic-aromatic mononuclear aryl radical, the aromatic nuclei being free from chromophores and ionogenic substituents.

Chiefly, the chlorine and bromine compounds are used as 2,4,6-trihalogen-1,3,5-triazine compounds; thus when X represents halogen it is advantageously chlorine or bromine.

The phenyl radical of the 7-amino coumarin compounds used according to the present invention can contain as non-ionogenic substituents, for example aliphatic groups such as methyl, ethyl, isopropyl, tert. butyl, isobutyl, 1,2-tetramethylene groups; alicyclic substituents such as the cyclohexyl group, araliphatic substituents such as the benzyl group halogens such as fluorine, chlorine or bromine, ether groups such as methoxy, ethoxy, butoxy, benzyloxy or phenoxy groups. However, the unsubstituted or the methyl or chlorine substituted phenyl radical is preferred. The production of such 7-amino-3-phenyl coumarins used according to the present invention is fully described in U.S. Patent 2,881,186.

Chiefly ammonia but possibly also hydroxyl amine or hydrazine is used as inorganic nitrogen base which is reacted according to the present invention. Chiefly, the aliphatic, cycloaliphatic and hydrogenated heterocyclic primary and secondary amines are used as organic nitrogen bases having a hydrogen atom which can be replaced at a basic nitrogen atom, for example, mono- and di-alkylamines such as methylamine, ethylamine, butylamine, octylamine, dodecylamine, hexadecylamine, hexadecenylamine, octadecylamine, diethylamine, dibutylamine, dioctylamine, methyldodecylamine, beta-hydroxy-ethylamine, beta-hydroxypropylamine, trihydroxy-tertiary butylamine, bis-hydroxyethylamine, cyclohexylamine, dicyclohexylamine, 2-hydroxy-cyclohexylamine; also araliphatic primary and secondary nitrogen bases such as benzylamine, para-methoxy-benzylamine, dibenzylamine, hydrogenated heterocyclic amines such as 2-amino-imidazoline, 2-amino-tetrahydropyrimidine, piperidine, morpholine; also mixed aliphatic, araliphatic-alicyclic-aliphatic secondary amines such as, for example N-methyl, N-ethyl or N-butyl-ethanolamine, N-benzyl-ethanolamine, N-cyclohexyl-ethanolamine; finally also primary and secondary aromatic amines, advantageously of the benzene series such as aminobenzene, aminomethyl benzenes, aminochlorobenzenes, aminoalkoxybenzene, aminophenol polyglycol ethers, N-alkylaminobenzenes, N-alkylaminoalkyl benzenes, N-alkylaminomethoxybenzenes, -halogenbenzenes, beta-hydroxyethoxy-aminobenzenes and amines of the heterocyclic series such as 2-amino-pyridine, 5-amino-1,2,4-triazole, 2-aminobenzthiazole.

The replacement of the third halogen atom by hydroxyl can be effected with alkali carbonates or with alkali hydroxides as well as earth alkali hydroxides. Ether groups are introduced advantageously in an excess of the organic hydroxyl or mercapto compound used in the reaction as alkali metal salt. The reaction of the last halogen atom with a primary or secondary organic amine is performed advantageously in an excess thereof, which amine acts as acid binding agent whilst the usual inorganic or organic acid binding agents can be used for the reaction of the first and second halogen atom, such as alkali bicarbonates, alkali carbonates or tertiary nitrogen bases such as triethylamine. If in the first and second reactions, low aliphatic amines are used, then the third halogen can also be reacted with the 7-amino-3-phenyl coumarin in the solution or melt at higher temperatures. For the rest, the conditions usual for such reactions are kept; that is the first halogen atom is reacted at a relatively low temperature, the second at medium temperatures and the third at higher temperatures. The most favourable temperature range is dependent on the reactivity of the amine used for the reaction.

Specific compounds include

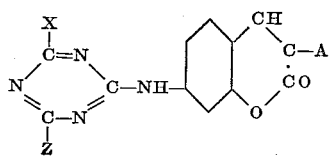

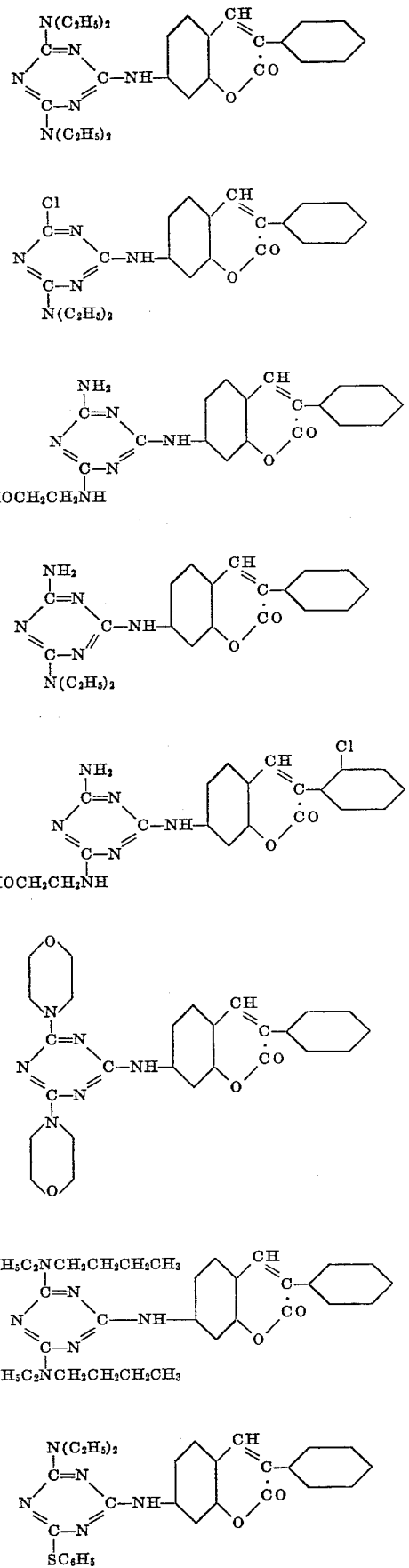

Any suitable polyester polyol may be used in accordance with the process of the present invention, such as, for example those from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid 1,4-cyclohexanedicarboxylic acid, 3,4,9,10 - perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

The improved polyester polyols of the invention are useful for the production of polyurethane plastics having improved color properties including threads which are whiter and brighter, urethane foams which have more sparkle and polyurethane coatings which are optically brighter. The threads, foams and coatings may be used where they have been used before, for example, for the preparation of clothing, stockings, pillows, coatings for wood, metal or the like.

The invention is further illustrated by the following example, in which parts are by weight unless otherwise specified.

Example

A polyester polyol is prepared by heating a mixture of about 15.6 mols of adipic acid, about 16.3 mols of diethylene glycol and about 1 mol of trimethylolpropane under a partial vacuum down to about 10 mm. Hg at a temperature of from about 200 to about 250° C. until the acid number falls to about 1 or less and the hydroxyl number reaches 56. A solution of calco violet blue dye having the structure indicated above. Color Index 60725, is prepared by dissolving 0.1 part of the calco violet in 99.9 parts of benzene. A solution of 7-triazinylamino-3-phenyl coumarin having the formula

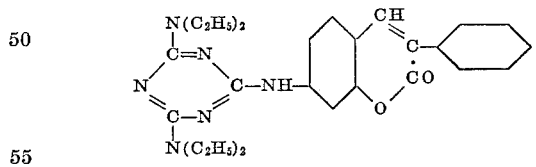

is prepared by dissolving 0.1 part of the coumarin in 99.9 parts of benzene. The resin temperature is reduced to about 80 to about 100° C. and 0.2 part of the calco violet solution and 0.2 part of the coumarin solution are added per 1000 parts of polyester. The polyester which previously had a yellow value on a spectrophotometer of .958 now has a yellow value of .9990 whereas APHA color is reduced from a value of 29 to 19.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyester polyol prepared by a process which comprises condensing a polycarboxylic acid and a stoichiometric excess polyhydric alcohol to a molecular weight of from about 500 to about 7500, said polyester containing from about 0.000005% to about 0.0003% by weight of a 7-triazinylamino-3-phenyl coumarin and from about 0.000005 to about 0.0003% by weight of an oil soluble blue dye.

2. The polyester polyol of claim 1 wherein said 7-triazinylamino-3-phenyl coumarin has the formula

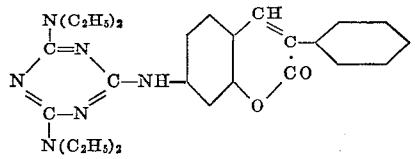

3. The polyester polyol of claim 1 wherein said 7-triazinylamino-3-phenyl coumarin has the formula

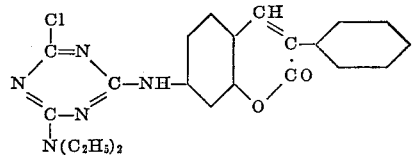

4. The polyester polyol of claim 1 wherein said 7-triazinylamino-3-phenyl coumarin has the formula

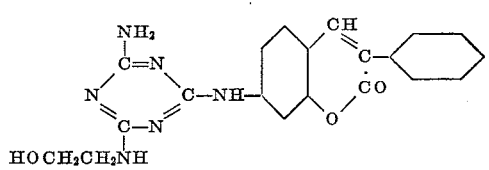

5. The polyester polyol of claim 1 wherein said 7-triazinylamino-3-phenyl coumarin has the formula

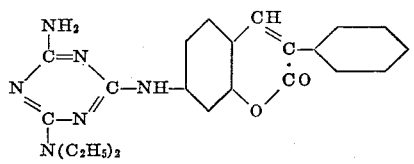

6. The polyester polyol of claim 1 wherein said 7-triazinylamino-3-phenyl coumarin has the formula

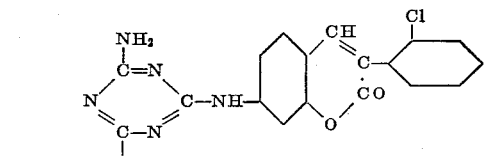

7. The polyester polyol of claim 1 wherein said 7-triazinylamino-3-phenyl coumarin has the formula

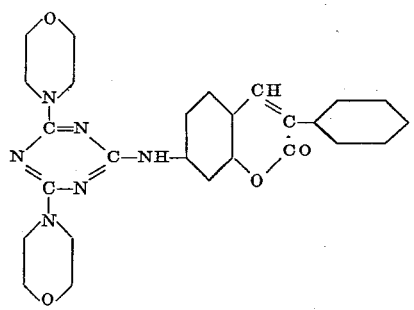

8. The polyester polyol of claim 1 wherein said 7-triazinylamino-3-phenyl coumarin has the formula

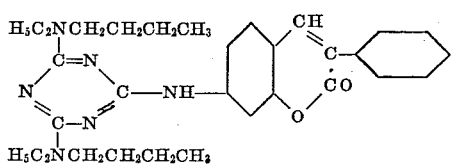

9. The polyester polyol of claim 1 wherein said 7-triazinylamino-3-phenyl coumarin has the formula

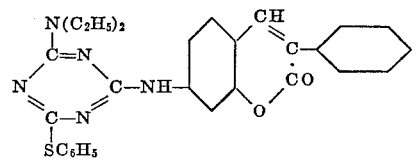

10. The polyester polyol of claim 1 wherein said oil soluble blue dye has the formula

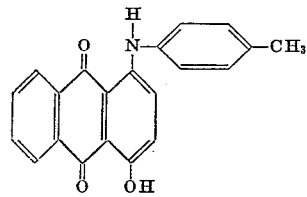

References Cited
UNITED STATES PATENTS 2,875,089    2/1959    Ackermann et al. ____ 117—33
2,945,033    7/1960    Hausermann _____ 117—33

MORRIS LIEBMAN, *Primary Examiner.*
S. L. FOX, *Assistant Examiner.*